United States Patent
Arsu et al.

(10) Patent No.: US 11,565,320 B2
(45) Date of Patent: Jan. 31, 2023

(54) PHOTO-CHEMICAL SYNTHESIS AND CHARACTERIZATION OF SILVER NANOPARTICLES SELF-ARRANGED ON CT-DNA AND BSA

(71) Applicant: Yildiz Teknik Universitesi, Istanbul (TR)

(72) Inventors: Nergis Arsu, Esenler-Istanbul (AR); Eyup Metin, Esenler-Istanbul (AR); Gonul Saadet Batibay, Esenler-Istanbul (AR); Nur Sena Okten, Esenler-Istanbul (AR)

(73) Assignee: Yildiz Teknik Universitesi, Istanbul (TR)

( * ) Notice: Subject to any disclaimer, the term of this patent is extended or adjusted under 35 U.S.C. 154(b) by 288 days.

(21) Appl. No.: 16/957,638

(22) PCT Filed: Dec. 27, 2018

(86) PCT No.: PCT/TR2018/050921
§ 371 (c)(1),
(2) Date: Jun. 24, 2020

(87) PCT Pub. No.: WO2019/132846
PCT Pub. Date: Jul. 4, 2019

(65) Prior Publication Data
US 2021/0053125 A1   Feb. 25, 2021

(30) Foreign Application Priority Data

Dec. 27, 2017 (TR) ................. 2017/22282
Dec. 24, 2018 (TR) ................. 2018/20232

(51) Int. Cl.
| | |
|---|---|
| *B22F 1/07* | (2022.01) |
| *B22F 9/24* | (2006.01) |
| *G01N 21/33* | (2006.01) |
| *G01N 21/64* | (2006.01) |
| *B22F 1/0545* | (2022.01) |

(52) U.S. Cl.
CPC .............. *B22F 9/24* (2013.01); *B22F 1/0545* (2022.01); *B22F 1/07* (2022.01); *G01N 21/33* (2013.01); *G01N 21/64* (2013.01); *Y10S 436/805* (2013.01)

(58) Field of Classification Search
CPC .. B22F 9/24; B22F 1/0545; B22F 1/07; B22F 1/102; G01N 21/33; G01N 21/64; G01N 2021/8411
See application file for complete search history.

(56) References Cited

U.S. PATENT DOCUMENTS 6,063,259 A * 5/2000 Wang ................. G01N 27/3275
204/403.14

FOREIGN PATENT DOCUMENTS

| CN | 106475572 A | 3/2017 |
|---|---|---|
| TR | 2010 09273 A2 | 5/2012 |

OTHER PUBLICATIONS

Eyup et al. In-Situ formation of self-assembled Ag nanoclusters on ct-DNA in the presence of 2-mercaptothioxanthone by using UV-vis light irradiation, Elsevier, Journal of Photochemistry and Photobiology A: Chemistry 356 Dec. 8, 2017, p. 1-6 (Year: 2017).*
Subrata Formation of self-assembled Ag nanoparticles on DNA chains with enhanced catalytic activity, RSC Publishing, Phys. Chem 2013, p. 14107-14119 (Year: 2013).*
Nese et al. "Studies of the binding mode of TXNHCH2COOH with calf thymus DNA by spectroscopic methods", Elsevier, Jun. 22, 2016 p. 128-133 (Year: 2016).*
Gebregeorgis et al. Characterization of Silver/Bovine Serum Albumin (AgBSA) nanoparticles structure: Morphological, compositional, and interaction studies, Elsevier, Aug. 30, 2012, p. 31-41 (Year: 2012).*
International Search Report and Written Opinion of the International Searching Authority for International Patent Application No. PCT/TR2018/050921 dated Apr. 29, 2019, 12 pages.
Aydin, M. et al., "One-Component Bimolecular Photoinitiating Systems, 2a", Macromol. Rapid Commun., 24: 718-723 (2003).
Cokbaglan, L. et al., "2-Mercaptothioxanthone as a Novel Photoinitiator for Free Radical Polymerization", Macromolecules, 36: 2649-2653 (2003).
Gebregeorgis, A. et al., "Characterization of Silver/Bovine Serum Albumin (Ag/BSA) nanoparticles structure: Morphological, compositional, and interaction studies", Journal of Colloid and Interface Science, 389: 31-41 (2013).
Kundu, S., "Formation of self-assembled Ag nanoparticles on DNA chains with enhanced catalytic activity", Phys Chem. Chem. Phys., 15: 14107-14119 (2013).
Mariam, J. et al., "Study of Interaction of Silver Nanoparticles with Bovine Serum Albumin Using Fluorescence Spectroscopy", J. Fluoresc, 21: 2193-2199 (2011).
McFarland, A. et al., "Single Silver Nanoparticles as Real-Time Optical Sensors with Zeptomole Sensitivity", Nano Letters, 3(8): 1057-1062 (2003).

(Continued)

*Primary Examiner* — David P Porta
*Assistant Examiner* — Mamadou Faye
(74) *Attorney, Agent, or Firm* — Merchant & Gould P.C.

(57) ABSTRACT

The present invention relates to examination of characteristics of silver nano-clusters self-arranged by means of reduction of silver salt to silver nanoparticles by means of 2-mercapto-thioxanthone on DNA and BSA in short photo-illumination duration of 1 second.

5 Claims, No Drawings

(56) References Cited

OTHER PUBLICATIONS

Metin, E. et al., "In-situ formation of self-assembled Ag nanoclusters on ct-DNA in the presence of 2-mercaptothioxanthone by using UV-vis light irradiation", Journal of Photochemistry and Photobiology A: Chemistry, 356: 1-6 (2017).
Nie, S. et al., "Probing Single Molecules and Single Nanoparticles by Surface-Enhanced Raman Scattering", Science, 275(5303): 1102-1106 (1997).
Prasanth, S. et al., "Exploring the interaction of L-cysteine capped CuS nanoparticles with bovine serum albumin (BSA): a spectroscopic study", RSC Adv, 6: 58288-58295 (2016).
Zon, V. et al., "Photo-induced growth of DNA-capped silver nanoparticles", Nanotechnology, 23: 1-7 (2012).

* cited by examiner

PHOTO-CHEMICAL SYNTHESIS AND CHARACTERIZATION OF SILVER NANOPARTICLES SELF-ARRANGED ON CT-DNA AND BSA

CROSS-REFERENCE TO RELATED APPLICATIONS

This application is a National Stage Application of PCT/TR2018/050921, filed 27 Dec. 2018, which claims the benefit of Turkish Patent Application No. 2017/22282, filed 27 Dec. 2017 in Turkey, and claims the benefit of Turkish Patent Application No. 2018/20232, filed 24 Dec. 2018, and which applications are incorporated herein by reference. To the extent appropriate, a claim of priority is made to each of the above-disclosed applications.

TECHNICAL FIELD

The present invention relates to silver nanoparticles obtained related to development of imaging methods for diagnosis and treatment purposes.

The present invention particularly relates to examination of characteristics of silver nano-clusters self-arranged by means of reduction of silver salt to silver nanoparticles by means of 2-mercapto-thioxanthone on DNA and BSA in short photo-illumination duration of 1 second.

KNOWN STATE OF THE ART

Thanks to the advantages provided by bio-technology and thanks to the increasing interest in research and application in the subject of DNA-metal nanoparticle/BSA-metal nanoparticle, pluralities of nano-dimensional materials are developed and used for diagnosis and treatment in biological systems.

Photovulcanization has some advantages over vulcanization like rapid curing, production at room temperature or at the minimum temperature and reduced reaction speed, like rapid curing, production at room temperature or at minimum temperature and reduced reaction speed. Moreover, it is very important that the chemicals and the product, used in said reactions, have low toxic effect.

When compared with other nanoparticles, noble metal nanoparticles (particularly AgNP) show attractive chemical, physical and mechanical properties, they are attractive and important materials. The basis of attractiveness of these materials is that these materials can be used in different areas like catalysis, nano-electronic, biomedical and sensor (1, 2).

To understand the interaction of nanoparticles with proteins is important for their effective usages in biological and medical applications. The interactions may change or deteriorate protein conformation. These conformational changes may induce unexpected biological reactions which lead to toxicity. The augmenting of the function of BSA as medicine release tool is based on the bio-conjugation of BSA with nanoparticles (3).

At recent times, UV illumination methods are frequently used instead of thermal methods. UV illumination methods allow nanoparticle synthesis in a shorter duration, with less number of steps and with lower temperatures. By means of these methods, DNA and BSA can be used as a mold in nanoparticle production and metal nanoparticles can be synthesized on DNA and BSA (4).

It is considered that metal nanoparticles can be synthesized with higher efficiency, with more rapid and higher dimensional stability by means of the development of different formulations and methods in the present art.

Photo-initiators are molecules which absorb light and which form reactive initiator radicals and which need one or more than one auxiliary molecule in a chemical system and which are used in a stand-alone manner, and they are the most important components of the systems of polymerization via UV. (5, 6).

Synthesis of silver nanoparticles is very popular because of pluralities of applications related thereto in various fields. Silver nanoparticles have optical and catalytic characteristics depending on the dimensions and shape of the produced nanoparticles. Therefore, silver nanoparticles are synthesized which have different shapes and which are used in different manners in different fields like medicine.

The patent application with number TR 2010 09273 can be given as example to synthesis of silver nanoparticles known in the related art. This invention relates to synthesizing method of silver nanoparticles by using natural biological reducers which may be effective on microorganisms in a wide area. By means of the invention, silver nanoparticle is obtained which can stay stable for long duration and whose injury healing characteristic is augmented and which has reduced unfavorable environmental effects.

In the known state of the art, photo-chemical formation of silver nano-clusters on DNA and BSA is realized as a result of long-duration UV illumination. However, long-duration illumination may lead to deterioration of DNA and BSA. Moreover, this long-duration illumination may affect the stability of silver nanoparticles in an unfavorable manner.

As a result, because of all of the abovementioned problems, an improvement is required in the related technical field.

OBJECT OF THE INVENTION

The present invention relates to photo-chemical synthesis and characterization of silver nanoparticles self-arranged on ct-DNA and BSA, for eliminating the above mentioned disadvantages and for bringing new advantages to the related technical field.

The object of the present invention is to realize photo-chemical synthesis of silver nanoparticles (Ag NP) and nano-clusters (Ag NC).

The object of the present invention is to increase silver nanoparticle synthesis speed, efficiency and nanoparticle dimensional stability by using 2-mercapto-thioxanthone as stabilization and photo-reducer agent.

The object of the present invention is to provide self-arrangement of silver nano-clusters as a result of reduction of silver salt to silver nanoparticles by means of 2-mercapto-thioxanthone on DNA and BSA in short photo-illumination duration of 1 second.

An object of the present invention is to examine the characteristics of silver nano-clusters obtained by photo-chemical synthesis.

In order to realize all of the abovementioned objects, the present invention relates to a method to be used in formation of silver nanoparticles and thus formation of silver nano-clusters on DNA and BSA, characterized in that 2-mercapto-thioxanthone is used as photo-reducer agent.

The structural and characteristic properties and all advantages of the present invention will be understood in a clearer manner thanks to the detailed description given below and therefore, evaluation shall be made by taking into consideration this detailed description.

DETAILED DESCRIPTION OF THE INVENTION

In this detailed description, the examination of characteristics of silver nano-clusters, which are self-arranged by means of reduction of silver salt to silver nanoparticles by means of 2-mercapto-thioxanthone on DNA and BSA in short photo-illumination duration of 1 second, is explained with references to examples without forming any restrictive effect only in order to make the subject more understandable.

The present invention relates to obtaining silver nanoparticles (Ag NP) and nano-clusters (Ag NC) by means of photo-chemical synthesis by using 2-mercapto-thioxanthone as stabilization and photo-reducer agent. In said invention, the reduction of silver salt to silver nanoparticles by means of 2-mercapto-thioxanthone on DNA and BSA in very short photo-illumination durations and the self-formed silver nano-clusters are examined.

An application of the present invention relates to a method used in formation of silver nanoparticles (AgNP) and formation of silver nano-clusters on DNA and/or BSA, said method is characterized in that 2-mercapto-thioxanthone is used as photo-reducer agent.

The self-arrangement of selective nanoparticles (like gold, silver) on DNA and BSA will provide development of nano-electronic tools. Some of the thioxanthone compounds are used in anti-cancer therapy because of their anti-tumor activities. Here 2-mercapto-thioxanthone, selected as photo-reducer substance for reducing silver salts to silver nanoparticles by means of photo-chemical illumination, is also effective in nanoparticle stabilization because of the thiol group existing in the structure thereof. Moreover, the cetyl radicals formed as a result of illumination show very good photo-reducer behavior.

From another perspective, the present invention relates to synthesis method of self-arranged silver nanoparticles on ct-DNA, said method comprises the steps of:
  a. Adding ct-DNA solution, 2-mercapto thioxanthone solution, Tris-HCl solution onto AgNO3 solution,
  b. Mixing the mixture until it becomes homogeneous,
  c. Taking the mixture into UV basin and subjecting the mixture to an UV light source at a distance between 1-10 cm,
  d. Taking UV-Vis absorption spectrum and fluorescence emission spectrum simultaneously in the duration of subjecting to light source,
  e. Concluding that the silver nanoparticles and/or silver nano-clusters are formed when peak is observed between 400 and 450 nm in UV-Vis spectrum.

In a preferred application of the present invention, AgNO3 solution used in step a) has a concentration between $0.5 \times 10^{-3}$ M and $3 \times 10^{-3}$ M, preferably $1 \times 10^{-3}$ M.

In a preferred application of the present invention, ct-DNA solution used in step a) has a concentration between $1 \times 10^{-5}$ M and $10 \times 10^{-5}$ M, preferably $5 \times 10^{-5}$ M.

In a preferred application of the present invention, 2-mercapto thioxanthone solution used in step a) has a concentration between $0.5 \times 10^{-3}$ M and $3 \times 10^{-3}$ M, preferably $1 \times 10^{-3}$ M.

In a preferred application of the present invention, in step a), AgNO3 solution, ct-DNA solution, 2-mercapto thioxanthone solution, Tris-HCl solution are used in volumetric proportion of 2:2:0.1:0.95.

In a preferred application of the present invention, in step c), Hamamatsu Lightningcure LC8 spot UV light is used as the UV light source.

In a preferred application of the present invention, in step c), the mixture is subjected to UV light source from distance of 7 cm.

In a preferred application of the present invention, in step c), the mixture is subjected to UV light source between 1 second and 150 seconds, preferably between 30 seconds and 120 seconds, for instance, for 30 seconds, 40 seconds, 50 seconds, 60 seconds, 70 seconds, 80 seconds, 90 seconds, 100 seconds, 110 seconds, 120 seconds.

From another perspective, the present invention relates to synthesis method of self-arranged silver nanoparticles on BSA, said method comprises the steps of:
  a. Adding BSA solution, 2-mercapto thioxanthone solution, Tris-HCl solution onto AgNO3 solution,
  b. Mixing the mixture until it becomes homogeneous,
  c. Taking the mixture into UV basin and subjecting the mixture to an UV light source at a distance between 1-10 cm,
  d. Taking UV-Vis absorption spectrum and fluorescence emission spectrum simultaneously in the duration of subjecting to light source,
  e. Monitoring formation of Ag nanoparticles (AgNP) and afterwards Ag nano-clusters (AgNC) from the absorption graphic.

In a preferred application of the present invention, AgNO3 solution used in step a) has a concentration between $0.5 \times 10^{-3}$ M and $3 \times 10^{-3}$ M, preferably $1 \times 10^{-3}$ M.

In a preferred application of the present invention, BSA solution used in step a) has a concentration between $0.5 \times 10^{-5}$ M and $3 \times 10^{-5}$ M, preferably $1 \times 10^{-5}$ M.

In a preferred application of the present invention, 2-mercapto thioxanthone solution used in step a) has a concentration between $0.5 \times 10^{-3}$ M and $3 \times 10^{-3}$ M, preferably $1 \times 10^{-3}$ M.

In a preferred application of the present invention, AgNO3 solution, ct-DNA solution, 2-mercapto thioxanthone solution, Tris-HCl solution used in step a) is used with proportion of 2:2:0.1:0.95.

In a preferred application of the present invention, in step c), Hamamatsu Lightningcure LC8 spot UV light is used as UV light source.

In a preferred application of the present invention, in step c), the mixture is subjected to UV light source from distance of 7 cm.

In a preferred application of the present invention, in step c), the mixture is subjected to UV light source between 1 second and 150 seconds, preferably between 30 seconds and 120 seconds, for instance, for 30 seconds, 40 seconds, 50 seconds, 60 seconds, 70 seconds, 80 seconds, 90 seconds, 100 seconds, 110 seconds, 120 seconds.

Photo-chemical illumination is used as the light source in order to provide formation of nano-cluster without damaging 2-mercapto-thioxanthone, DNA and BSA as photo-reducer substance which reduces metal salts to nanoparticles and nano-clusters in both of the abovementioned photo-chemical syntheses.

DNA and BSA are items required for diagnosis in biological systems.

Illumination via UV-Vis light stimulates 2-mercapto thioxanthone substance and is effective in the formation of reducer particles.

By means of the subject matter invention, the synthesis of silver nanoparticles and nano-clusters, having great importance in diagnosis and treatment, is provided in a dimension-controlled manner and in a much shorter time when compared with the prior art.

The present invention is explained with examples without forming any restrictive effect only in order to make the subject more understandable.

Example 1: Photochemical Synthesis of
Self-Arranged Silver Nanoparticles on ct-DNA 1 ml $5\times10^{-5}$ M ct-DNA solution, 0.05 ml $1\times10^{-3}$ M 2-mercapto thioxanthone (TXSH) solution and 0.95 ml Tris-HCl solution are added onto 1 ml $1\times10^{-3}$ M AgNO3 solution, In order to provide homogeneous distribution, the mixture whose total solution volume is 3 ml is mixed for 10 minutes in a beaker, The solution which is taken from the beaker into the quartz basin is illuminated from distance of 7 cm by means of Hamamatsu Lightningcure LC8 spot UV light, Depending on the illumination duration, UV-Vis absorption spectrum and fluorescence emission spectrum are taken simultaneously, Depending on the illumination duration, the formation of Ag nanoparticles (AgNP) and afterwards, the formation of Ag nano-clusters (AgNC) are monitored from the absorption graphic.

Depending on the illumination duration, the characteristic peak, which belongs to the silver nanoparticles in the vicinity of 428 nm in UV-Vis absorption spectrums for the AgNPs which form in 0-30 seconds of illumination duration on ct-DNA, is seen, and the color change in the solution confirms the formation of silver nanoparticles. As a result of increasing of the illumination duration, absorbance values at 450 nm increase. As can be seen in UV-Vis absorption spectrums of AgNPs which form in 0-30 seconds of illumination duration on ct-DNA, the solution, which was colorless before the illumination, shows color change even after 1 second of illumination. As the illumination duration increases, the peaks at 428 nm become more apparent.

Depending on the illumination duration, the characteristic peak, which belongs to the silver nanoparticles in the vicinity of 428 nm in UV-Vis absorption spectrums for the AgNPs which form in 0-120 seconds of illumination duration on ct-DNA, is seen, and the color of the solution has changed when compared with the illumination duration of 30 seconds. As a result of increasing illumination duration, the absorbance values at 428 nm increase. As can be seen in UV-Vis absorption spectrums of AgNP's which form in 0-120 seconds of illumination duration on ct-DNA, the solution, which was colorless at the first instant, begins showing color change after illumination. As the illumination duration increases, the peaks at 428 nm become more apparent. The relation between the illumination duration and silver nanoparticle formation reaches optimum level at the end of 120 seconds, and the absorption spectrum stays nearly fixed.

In the fluorescence emission spectrums taken depending on the illumination duration of the ct-DNA+TXSH+AgNO3 solution, it is observed that fluorescence emission decreases since the solution, stimulated at 380 nm, shows surface plasmon resonance effect depending on AgNP concentration which increases at the end of illumination duration of 10, 20 and 30 seconds.

In a similar manner, when the illumination duration is increased to 120 seconds, in the fluorescence emission spectrum of the solution illuminated for 120 seconds, it is observed that AgNPs strongly reduce fluorescence emission of the solution and that there remains nearly no fluorescence emission of the solution at the end of 120 seconds.

AgNP dimensions, formed during 30 seconds of illumination duration, change between 40-60 nm and the size of the formed AgNC is measured at each 600 nm. In solutions illuminated for 120 seconds, it is observed that AgNP dimension is reduced and AgNP dimension is between 30-50 nm.

Example 2: Photochemical Synthesis of
Mono-Disperse Silver Nanoparticles in Presence of
BSA 1 ml $1\times10^{-5}$ M BSA solution, 0.05 ml $1\times10^{-3}$ M 2-mercapto thioxanthone (TXSH) solution and 0.95 ml Tris-HCl solution are added onto 1 ml $1\times10^{-3}$ M AgNO3 solution, In order to provide homogeneous distribution, the mixture whose total solution volume is 3 ml is mixed for 10 minutes in a beaker, The solution which is taken from the beaker into the quartz basin is illuminated from distance of 7 cm by means of Hamamatsu Lightningcure LC8 spot UV light, Depending on the illumination duration, UV-Vis absorption spectrum and fluorescence emission spectrum are taken simultaneously, Depending on the illumination duration, the formation of Ag nanoparticles (AgNP) and afterwards, the formation of Ag nano-clusters (AgNC) are monitored from the absorption graphic.

As observed in UV-Vis absorption spectrums of AgNPs formed in the illumination duration of 0-180 seconds on BSA, the surface plasmon resonance (SPR) of Ag+ ions reduced to AgNP occurs at the end of the illumination of 1 second. Depending on the illumination duration, the intensity of SPR increases at the end of 180 seconds and increases from 0 to 1.04 optical density value. The solution, which was colorless before illumination, turns into light brown color as a result of 3 minutes of illumination. This change shows the presence of AgNPs and AgNCs formed in BSA.

In the fluorescence emission spectrum of the solution illuminated for 180 seconds, the emission spectrum of TX-SH is observed in the stimulation graphic before the illumination of the example stimulated at 390 nm. As a result of 1 second of illumination, it is observed that emission intensity increases 2 times. This change shows the effect of TX-SHs, connected to formed nanoparticles, on emission intensity. This shows that AgNPs and AgNCs, formed by means of the increase of the illumination duration, eliminate the emission of TX-SH and decrease the fluorescence emission intensity.

In the fluorescence emission spectrum of the solution illuminated for 30 seconds, it is observed that the intensity of the example, whose emissions are taken at 465 nm stimulation wavelength, increases at the end of the first 1 second illumination as in 390 nm, and it is observed that the intensity decreases at the illumination duration of 5 and 10 seconds depending on the illumination duration. It is observed that when the illumination duration is increased to 30 seconds, the emission intensity increases, however, it is observed that said emission intensity is lower than the value obtained as a result of illumination duration of 1 second.

In dimension analysis obtained from SEM images, it is found that the dimensions of AgNPs are between 21-49 nm. It is observed that the dimensions of nano-clusters are between 122-564 nm.

It has been detected that, by means of the subject matter method, self-arranged silver nano-clusters are formed on BSA and DNA and they have mono-disperse dimension, and that this is due to the used 2-mercapto-thioxanthone, and that silver nanoparticles can be formed in short illumination duration of even 1 second.

RESOURCES

1) McFarland, A. D. and Van Duyne, R. P., (2003), "Single Silver Nanoparticles as Real-Time Optical Sensors with Zeptomole Sensitivity", Nano Lett., 3(8):1057-1062.
2) Nie, S. and Emory, S. R., (1997), "Probing Single Molecules and Single Nanoparticles by Surface-Enhanced Raman Scattering", Science, 275(5303):1102-1106.
3) Prasanth, S., et al., (2016) "Exploring the interaction of L-cysteine capped CuS nanoparticles with bovine serum albumin (BSA) a spectroscopic study", RSC Advances, 6, 58288-58289.
4) Kundu, S., (2013) "Formation of self-assembled Ag nanoparticles on DNA chains with enhanced catalytic activity", Phys. Chem. Chem. Phys, 15(33):14107-14119.
5) Çokbağlan, L., Arsu, N., Yağci, Y., Jockusch, S. and Turro, N. J., (2003) "2-Mercaptothioxanthone as a novel photoinitiator for free radical polymerization", Macromolecules, 36:2649-2653.
6) Aydin M., Arsu N. and Yağci Y., (2003) "Thioxanthone acetic acid derivatives as photoinitiators for free radical polymerization", Macromolecular Rapid Communications, 24:718-723.

The invention claimed is:

1. A method for obtaining self-arranged silver nanoparticles in which color change is observed after a photo-illumination duration of 1 second on ct-DNA and which is compliant for usage in development of imaging methods for diagnosis and treatment purposes, the method comprising:
   a) Adding a ct-DNA solution having a concentration of ct-DNA in a range from $1\times10^{-5}$ M and $1\times10^{-4}$ M, a 2-mercapto thioxanthone solution having a concentration in a range from $0.5\times10^{-3}$ M and $3\times10^{-3}$ M, and a Tris-HCl solution to an $AgNO_3$ solution having a concentration in a range from $0.5\times10^{-3}$ M and $3\times10^{-3}$;
   b) mixing the mixture formed in step a) until it becomes homogeneous;
   c) subjecting the mixture to an UV light source at a distance between 1-10 cm;
   d) taking UV-Vis absorption spectrum and fluorescence emission spectrum simultaneously in the duration of subjecting to light source;
   e) concluding that the silver nanoparticles and/or silver nano-clusters are formed when peak is observed between 400 and 450 nm in UV-Vis spectrum.

2. The method of obtaining silver nanoparticle on ct-DNA according to claim 1, wherein in step a), the $AgNO_3$ solution, the ct-DNA solution, the 2-mercapto thioxanthone solution, and the Tris-HCl solution are used in volumetric proportion of 2:2:0.1:0.95.

3. The method of obtaining silver nanoparticle on ct-DNA according to claim 1, wherein in step c), the mixture is subjected to UV light source between 1 second and 150 seconds.

4. A method for obtaining self-arranged silver nanoparticles on BSA and which is compliant for usage in development of imaging methods for diagnosis and treatment purposes, characterized by comprising the process steps of:
   a) Adding a BSA solution having a concentration of BSA in a range from $0.5\times10^{-3}$ M and $3\times10^{-3}$ M, a 2-mercapto thioxanthone solution having a concentration of 2-mercapto thioxanthone in a range from $0.5\times10^{-3}$ M and $3\times10^{-3}$ M, and a Tris-HCl solution to an $AgNO_3$ solution having a concentration of $AgNO_3$ in a range from $0.5\times10^{-3}$ M and $3\times10^{-3}$ M;
   b) mixing the mixture formed in step a) until it becomes homogeneous;
   c) subjecting the mixture to an UV light source at a distance between 1-10 cm;
   d) taking UV-Vis absorption spectrum and fluorescence emission spectrum simultaneously in the duration of subjecting to light source,
   e) monitoring formation of Ag nanoparticles (AgNP) and afterwards Ag nano-clusters (AgNC) from the absorption graphic.

5. The method of obtaining silver nanoparticle on BSA according to claim 4, wherein in step c), the mixture is subjected to UV light source between 1 second and 150 seconds.

* * * * *